April 20, 1954 G. RIDGE 2,675,936
PALLET ATTACHMENT FOR WIREBOUND PACKAGES
Filed Aug. 9, 1950 3 Sheets-Sheet 1
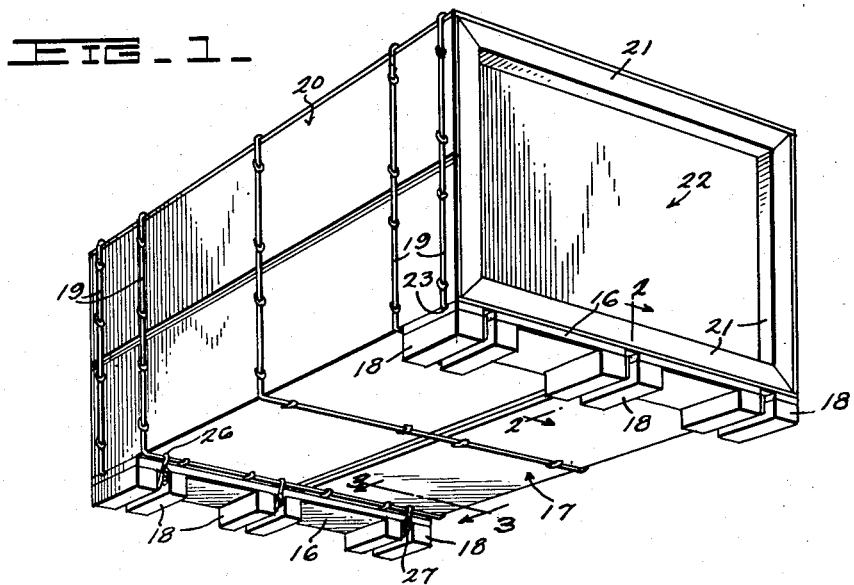
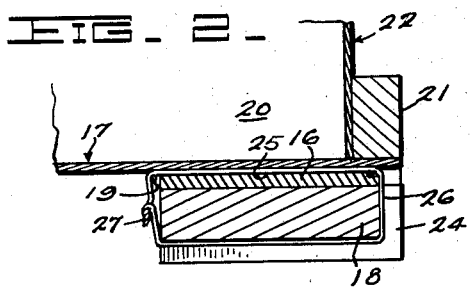
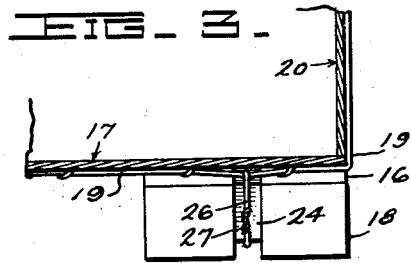
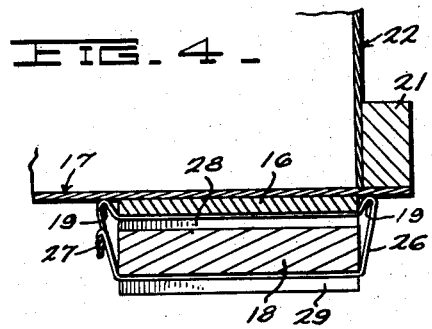
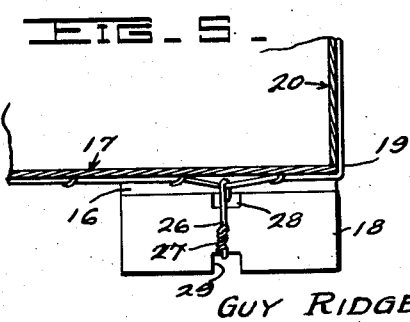
Inventor
GUY RIDGE
By Aaron R. Townshend Jr.
ATTORNEY

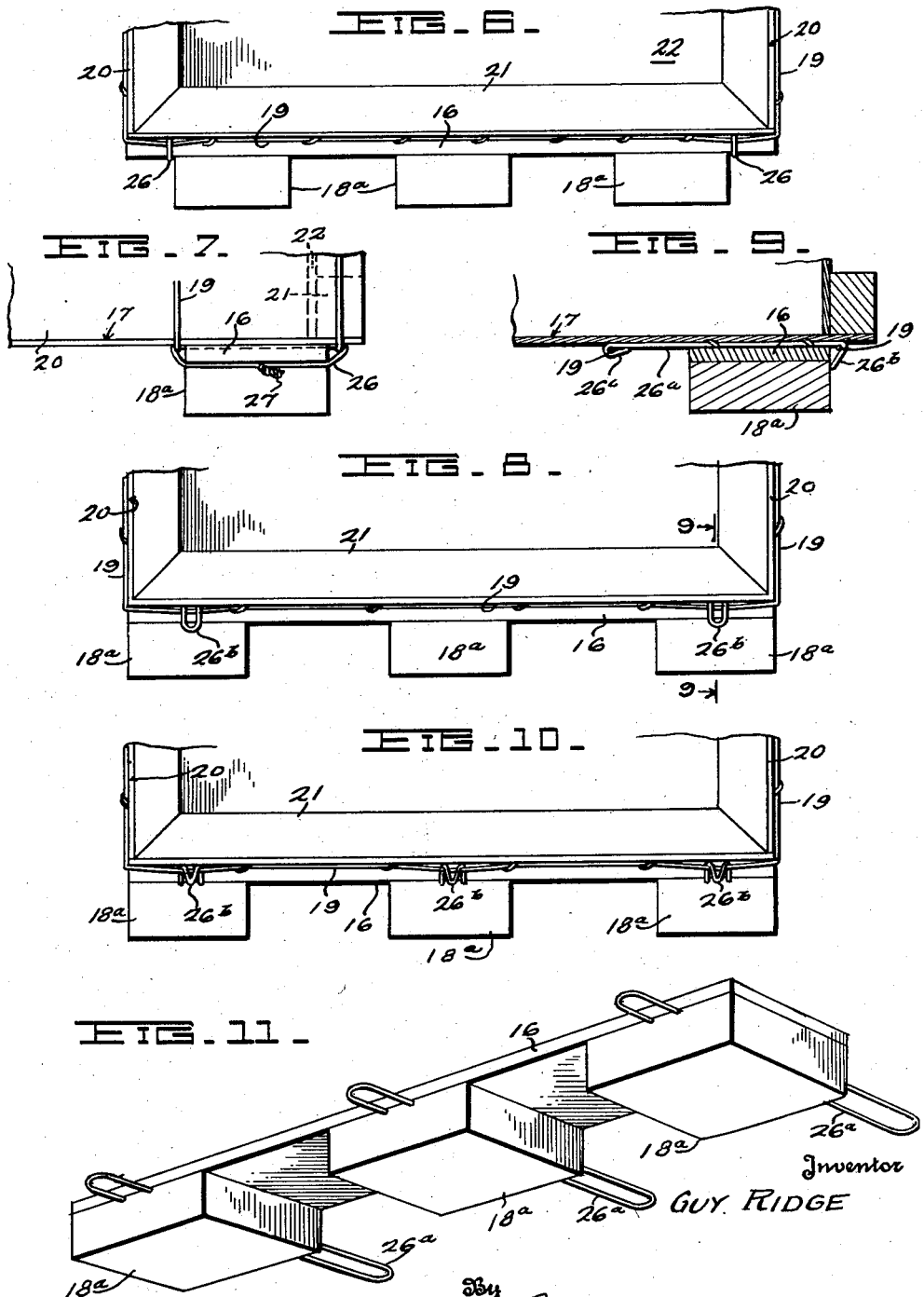

April 20, 1954 G. RIDGE 2,675,936
PALLET ATTACHMENT FOR WIREBOUND PACKAGES
Filed Aug. 9, 1950 3 Sheets-Sheet 3
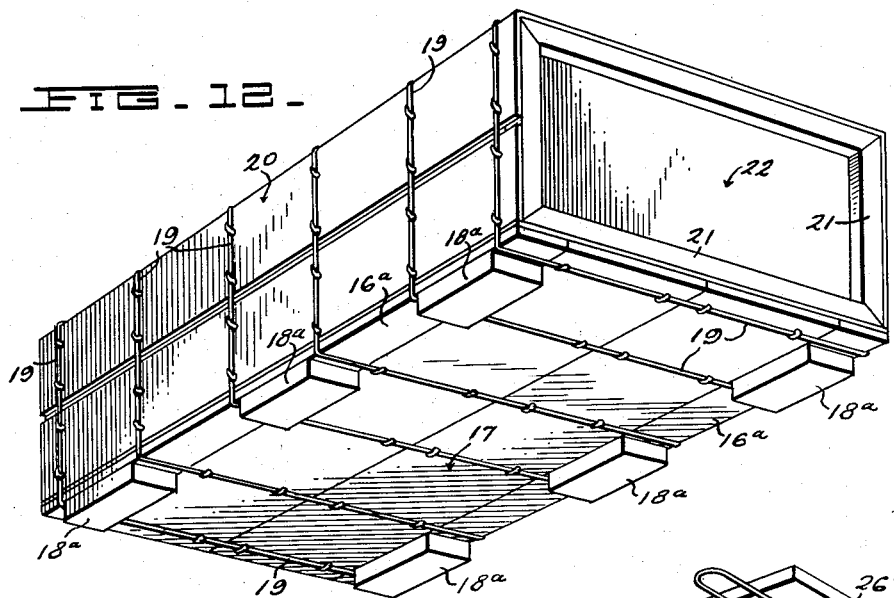
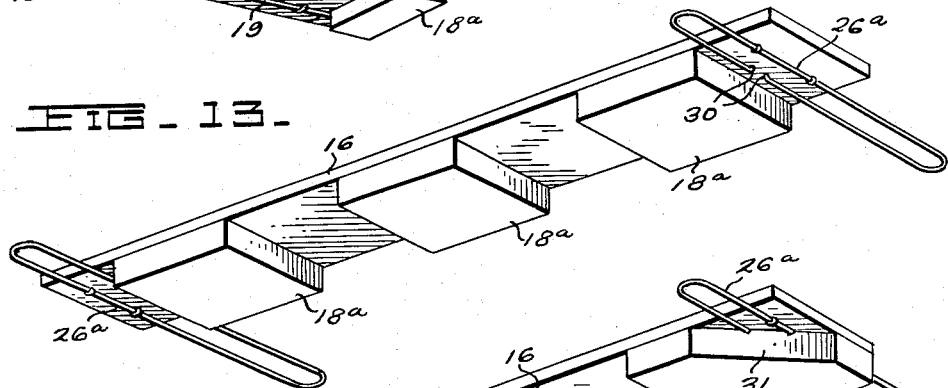
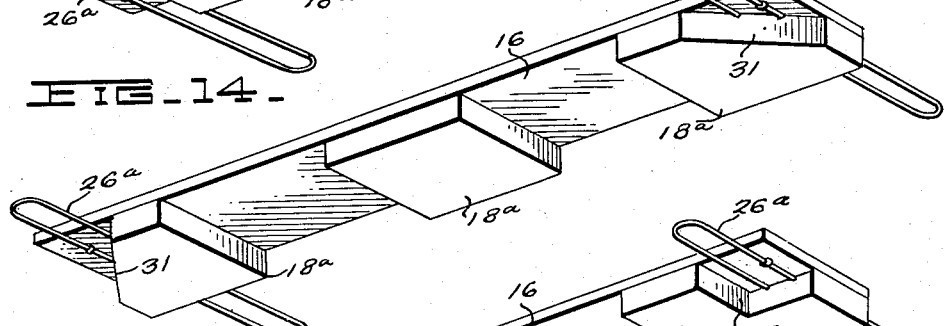
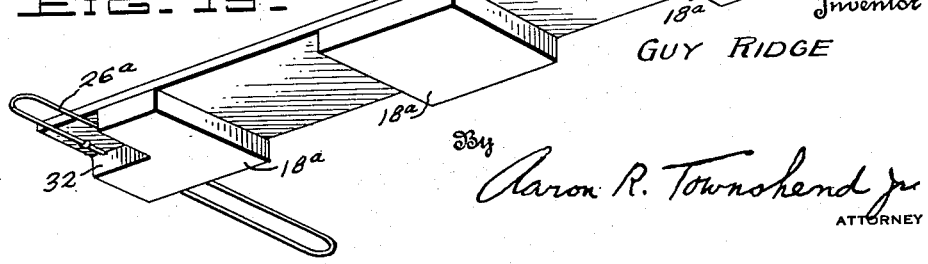
Inventor
GUY RIDGE
By Aaron R. Townshend Jr.
ATTORNEY Patented Apr. 20, 1954

2,675,936

UNITED STATES PATENT OFFICE 2,675,936

PALLET ATTACHMENT FOR WIREBOUND PACKAGES

Guy Ridge, Bartow, Fla., assignor to Elberta Crate & Box Co., Tallahassee, Fla., a corporation of Georgia Application August 9, 1950, Serial No. 178,420

4 Claims. (Cl. 217—12)

This invention relates to the art of wooden receptacles such as crates, boxes, and the like, of the external wirebound package type comprising collapsible wall sections serially connected in foldable relation by flexible wire binders. In particular, the invention deals with pallet attachments therefor, by which a package in set up service form is converted for use itself as a pallet for supporting a load of other packages stacked thereon.

Current freight handling and stevedoring practice makes wide use of pallets engageable by the forks of lift trucks for transporting piles of packages and the like that are stacked on the pallets. Usually the pallets remain with their loads throughout all handling stages thereof, so that a large supply of pallets must be constantly available at loading and shipping points. There is considerable loss of pallets through damage and failure to return, and in consequence their cost is evidenced in handling charges that are burdensome to shippers and consumers alike. Not only are pallets individually expensive, but also their usage entails the expenditure of man hours in placing and handling, aside from actual service.

The present invention is designed to eliminate the cost and the use of pallets in the handling of large piles of wirebound packages and the like, without sacrificing any of the benefits incident to their employment.

A primary object of the invention is to provide a simple, inexpensive attachment capable of ready detachable engagement with a wirebound package to convert the same into a pallet for supporting a load stacked thereon.

Another object is to provide a wirebound package or the like having self-contained pallet means adapted for engagement by the fork of a lift truck or similar material handling apparatus.

Other objects will be apparent to those skilled in the art.

In the drawings:

Figure 1 is a bottom perspective view of a wirebound package with pallet attachment in service position thereon;

Figure 2 is a fragmentary sectional view on the line 2—2 of Figure 1;

Figure 3 is a fragmentary sectional view on the line 3—3 of Figure 1;

Figures 4 and 5 are, respectively, sectional views similar to Figures 2 and 3 but illustrating an alternative embodiment of the attachment;

Figure 6 is a fragmentary end elevation of a wirebound package equipped with another alternative form of pallet attachment;

Figure 7 is a sectional view on the line 7—7 of Figure 6;

Figure 8 is a fragmentary end elevation of a wirebound package having thereon a further alternative form of the attachment;

Figure 9 is a sectional view on the line 9—9 of Figure 8;

Figure 10 is a fragmentary end elevation of a wirebound package with still another form of the attachment secured thereon;

Figure 11 is a bottom perspective view of the pallet attachment shown in Figure 10;

Figure 12 is a bottom perspective view of a wirebound package in which the pallet attachment forms an enclosing part of the package bottom section; and Figures 13, 14 and 15 are bottom perspective views, respectively, of still other forms of the attachment.

Wirebound packages are manufactured conventionally as blanks comprising top, bottom, and side wall panels serially connected in foldable hinged relation by flexible wire binders or straps stapled or otherwise suitably secured at a plurality of points to the exterior faces of the panels. They are supplied to the trade in flattened knockdown form, with attachable end panels, and are unfolded and assembled in set up form when they are placed in service. A stack of such packages cannot be handled as a unit by fork lifts and the like unless they are first stacked on a pallet, because the bottom of the lowermost package rests flatly in face contact with the ground or floor. The present invention provides spacer means readily attachable to the bottom panel of a package blank in a manner to support the package bottom in sufficiently raised position above a floor to permit ready engagement of a lift fork beneath the package; thus converting the package itself into a pallet for other packages stacked on its top.

The pallet attachment shown in Figures 1-3 comprises a flat cleat 16 dimensioned to underlie the bottom panel 17 of a package at least at each end thereof in flush edge relation transversely across the full width of the panel. A plurality of spacer blocks 18, here shown as one at each end and one in the middle, are rigidly fixed on the underface of the cleat as by nailing, stapling, or the like, with the blocks disposed transversely across the cleat in flush edge relationship therewith. The blocks are spaced apart longitudinally of the cleat a distance sufficient to accommodate the passage of the tines of a lift fork between them.

Binder wires 19 conventionally stapled to the outer faces of the bottom 17, wall panels 20, and the top panel, extend transversely across these members in parallel spaced relation and connect them in foldable hinged relation. As here shown, the outermost binder at each end of the package is registered with the conventional cleats 21 which mount the end panels 22. Across the bottom panel 17 the wire is adapted to seat in a longitudinal groove 23 provided in the top face of the cleat 16, when the cleat is secured in place on the bottom panel. The binder wire next adjacent each outermost end wire is so placed that, when the cleats are attached, the wire extends alongside the inner straight edge of the cleat, as indicated in Figure 2.

Each spacer block 18 is milled with a bottom face channel 24 for its full width transversely of the cleat 16. This channel is continued upwardly in the outer side face of the block and through the overlying outer side edge of the cleat; and in continuation thereof the top face of the cleat is provided with a shallow transverse channel 25 aligned with the channel 24 and intersecting the groove 23. If desired, the channels may be provided only in the blocks at the two ends of the cleat 16. These communicating channels 24—25 form a housing for a length 26 of binder wire that is passed through the cleat channel 25 between the binders 19 and the bottom panel and looped with its ends twisted together as at 27 alongside the inner side face of the block, whereby the attachment comprising the cleat and its affixed spacer blocks is secured in service position on the under face of the package bottom panel. The housing provided by the channels 24—25, and the location of the twist connection 27, so disposes the securing means comprising the loop 26 that no portion thereof projects outwardly of either the bottom or the ends of the package. If desired, the twist connection may be made anywhere along the channels 24—25 and be bent inwardly for housing therein.

Another manner of securing the pallet attachment in service position is illustrated in Figures 4 and 5. In this embodiment the cleat 16 is set inwardly between the adjacent pair of binders 19 with its outer straight edge substantially aligned with the end panel 22, and both the top and bottom faces of the spacer blocks 18 are provided with transverse channels 28 and 29, respectively. The length of attaching wire 26 is passed between the bottom panel and the binders 19 and housed in the block channels 28 and 29 with its twisted ends connection disposed as previously described.

Figures 6 and 7 illustrate a further alternative embodiment of the invention, in which the cleats 16 are attached to the bottom panel 17 by passing the securing loops 26 directly around the cleat at each end between the bottom panel and the binder wires 19. In this form the spacer blocks 18a are plain, and the block at each end of the cleat is spaced inwardly approximately the width of the adjacent end panel cleat 21.

Figures 8 and 9 show still another form of the attachment in which the plain spacer blocks 18a are secured on the cleat 16 at each end and in the middle. Above the spacer block at each end the cleat carries a length of binder wire 26a suitably attached to its top face and shaped as a flat oblong loop disposed transversely across the cleat with the ends extending therefrom at different distances to provide attaching tongues projected laterally beyond the side edges of the cleat. In this form of the invention the cleats underlie the bottom panel 17 at the same locations as in Figure 7, but the binder 19 next adjacent the endmost binder is spaced farther therefrom than in the preceding forms. The attachment is secured in place on the bottom panel 17 by inserting the longer tongues of the loops 26a between the inner binder 19 and the bottom panel and sliding the cleat inwardly along the panel until the shorter tongues pass beneath the outer binder; whereupon the cleat is shifted outwardly with the shorter tongues inserted between the outer binder and the bottom panel. The terminal portions 26b of the shorter tongues are then bent down around the outer binder and against the outer sides of the spacer blocks, and the terminal portions 26c of the longer tongues are bent back upon the tongues and around the inner binder, whereby the cleats are secured firmly in place.

The embodiment shown in Figures 10 and 11 is identical with that shown in Figures 8 and 9 except that a loop 26a is located at each of the three spacer blocks on the cleat, and the body of the loop is anchored between the top face of the block and the overlying cleat.

Figure 12 illustrates an embodiment of the invention in which the pallet attachment itself is an enclosing part of the package. As in the preceding forms, the walls, top, and bottom are serially connected by a plurality of wire binders 19 with the outermost binder at each end of the package registering with the cleats 21 which mount the end panel 22. The bottom panel 17, however, terminates at its side edges inwardly from the ends of its associated cleat 21, being less than the full width of the package. The gap thus remaining between each side edge of the bottom panel and the adjacent wall panel 20 is filled by a bottom slat or section 16a generally similar to the previously described cleats 16 and likewise having secured thereto the plain spacer blocks 18a. The block at each end of the slat is spaced inwardly from the end, so that the overhang at the slat end engages over and seats upon the adjacent end binder wire when the slat is positioned in the gap to complete the bottom panel.

Figures 13, 14, and 15 disclose three further alternative forms of the pallet attachment. Each is substantially similar to the form in Figure 11 and includes the same assembly of cleat 16, spacer blocks 18a, and securing loops 26a with short and long tongues adjacent each end of the cleat. In the Figure 13 form the loops 26a are attached directly to the under face of the cleat by terminal prongs 30 anchored in the end overhang. In the Figures 14 and 15 forms the end blocks are flush with the cleat ends and the loops 26a are anchored between the top face of the block and the overlying portion of the cleat.

In each of the forms of Figures 14 and 15 housing is provided to receive the terminal portions of the shorter tongues of the loops 26a when they are bent around a binder wire as in the manner shown at 26b in Figure 10. In the Figure 14 form the corner of each end spacer block 18a is cut away at an angle, as at 31, to provide the housing space; and in the Figure 15 form the block corners are cut away as at 32 to provide a squared housing socket.

Although certain specific embodiments of the invention have been herein shown and described, it is to be understood that the invention is capable of practice in any form comprised within its scope as claimed, and it is so intended. It is within the purview of my invention that additional cleats with attached spacer blocks may be provided at desired points between those at the ends of the package, and that the cleats may be attached to the binder wires in the manner disclosed on any or all of the four walls of the package. In the specification and claims, the term "bottom" means that wall of a wirebound package seated in face contact with a floor or ground surface at any given moment.

I claim:

1. In combination with a wirebound package structure comprising walls serially connected in foldable hinged relation by a plurality of flexible binders attached to the outer face of each wall at a plurality of relatively close points on each and arranged in substantially parallel spaced relation; at least one pallet on at least one wall between a pair of adjacent binders in face contact with the wall, and securing members passed between each of said pair of adjacent binders and the wall intermediate two successive binder attachment points in holding engagement with the pallet whereby it is fixedly secured to the package structure, said pallet comprising a cleat having thereon ground spacer blocks mutually separated a distance sufficient to accommodate the tines of a fork lift therebetween.

2. In the combination of claim 1, said blocks being face-grooved, and said securing members comprising lengths of flexible binders housed in the block grooves and with the two ends of each length connected together.

3. In the combination of claim 1, and said securing members comprising lengths of flexible binders passed around the cleat with the two ends of each length connected together.

4. In the combination of claim 1, and said securing members comprising tongues fixed on said cleat and extending laterally from opposite sides thereof.

References Cited in the file of this patent

UNITED STATES PATENTS

| Number | Name | Date |
|---|---|---|
| 1,371,208 | Babcock | Mar. 8, 1921 |
| 1,988,513 | Ricketts et al. | Jan. 22, 1935 |
| 2,029,983 | Burke | Feb. 4, 1936 |
| 2,159,622 | Sanford | May 23, 1939 |
| 2,287,056 | Owens | June 23, 1942 |
| 2,507,693 | Collier | May 16, 1950 |
| 2,526,228 | Hammer | Oct. 17, 1950 |
| 2,534,010 | Frye | Dec. 12, 1950 |